United States Patent
Jurica et al.

[11] Patent Number: 5,938,272
[45] Date of Patent: *Aug. 17, 1999

[54] VEHICLE BED

[75] Inventors: Joseph J. Jurica, Mt. Clemens; Arnold L. Brown, Macomb, both of Mich.

[73] Assignee: Pullman Industries, Inc., Pullman, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/780,834

[22] Filed: Jan. 10, 1997

[51] Int. Cl.⁶ .................................................. B60R 27/00
[52] U.S. Cl. ........................ 296/183; 296/182; 296/204; 296/29; 296/198
[58] Field of Search ..................... 296/183, 182, 296/204, 29, 30, 198; 52/798.1, 800.11

[56] References Cited

U.S. PATENT DOCUMENTS

| | | | |
|---|---|---|---|
| 1,469,321 | 10/1923 | Kramer | 52/798.1 |
| 2,301,636 | 11/1942 | Nicol. | |
| 2,853,330 | 9/1958 | Harry. | |
| 3,253,375 | 5/1966 | Takehara. | |
| 3,310,925 | 3/1967 | Le Brun. | |
| 3,481,643 | 12/1969 | Campbell | 296/204 |
| 4,188,058 | 2/1980 | Resa et al.. | |
| 4,215,898 | 8/1980 | Ulics. | |
| 4,354,708 | 10/1982 | Koto. | |
| 4,631,891 | 12/1986 | Donavich. | |
| 4,914,886 | 4/1990 | Eriksson et al.. | |
| 5,137,322 | 8/1992 | Muirhead. | |
| 5,188,418 | 2/1993 | Walworth, Jr. et al.. | |
| 5,544,932 | 8/1996 | Walworth, Jr. et al.. | |
| 5,575,525 | 11/1996 | Walworth, Jr. et al.. | |

FOREIGN PATENT DOCUMENTS

| | | | |
|---|---|---|---|
| 1 329 659 | 5/1963 | France. | |
| 1432250 | 2/1966 | France | 296/183 |
| 30 12 567 | 10/1981 | Germany. | |
| 30 12 567 A1 | 10/1981 | Germany. | |

Primary Examiner—D. Glenn Dayoan
Assistant Examiner—Long Bao Nguyen
Attorney, Agent, or Firm—Flynn, Thiel, Boutell & Tanis, P.C.

[57] ABSTRACT

A vehicle bed assembly, and process of manufacture, which involves formation of a one-piece floor pan by roll forming. The floor pan has a central pan portion and secondary portions positioned forwardly and rearwardly of wheelwell openings formed in the pan adjacent opposite side edges thereof. Strengthening ribs extend longitudinally throughout the entire length of the pan and terminate at the front and rear edges. The strengthening ribs also extend longitudinally of the secondary portions and terminate at front and rear edges of the wheelwell openings. The one-piece floor pan has the wheelwell openings formed therein, as by a controlled notching operation, after the pan has been roll formed from flat sheet material, and the notching operation provides a series of flanges around the periphery of the wheelwell opening, both along the longitudinal inner edge and on the front and rear edges. Some of the flanges are coplanar with top walls of the stiffening ribs, and others are coplanar with the base wall of the pan between the stiffening ribs. The roll-formed pan is subjected to a subsequent forming operation which causes the flanges to be wiped downwardly generally into a perpendicular relationship so that the flanges are positionable in overlapping relationship to the vehicle inner side wall or wheelwell housing for securement thereto, such as by welding.

18 Claims, 9 Drawing Sheets

VEHICLE BED

FIELD OF THE INVENTION

This invention relates to an improved one-piece ribbed floor pan for a vehicle bed, such as a truck bed, and the related process of manufacture.

BACKGROUND OF THE INVENTION

A box of a vehicle, such as a pickup truck, is illustrated in FIG. 1. This box conventionally includes a horizontally enlarged floor or bed assembly 12 which extends sidewardly between and is joined to generally parallel and upwardly extending side panels or walls 13. The side panels 13 conventionally have wheelwell housings 14 formed therein, the latter typically projecting at least inwardly a small extent into the interior of the box. The front end of the floor assembly 12 is also rigidly joined to an upwardly-projecting front wall or panel 15, the latter extending between and being rigidly fixed to the side panels 13. The rear of the box is normally closed by a rear panel 16, the latter conventionally being an openable tailgate 16 which is conventionally hingedly joined to the box and can swing into an open generally horizontal position wherein it is substantially flush with the floor assembly to provide access to the interior of the box.

This box, and specifically the floor or bed assembly 12, conventionally includes a horizontally enlarged main bed member 17, commonly referred to as the floor pan, which defines the actual floor of the box and extends lengthwise between the front and rear ends of the box, and has a width which normally substantially spans the width of the opening between the wheelwell housings. This main floor pan 17 is supported on a front cross rail 18, several intermediate cross rails 19, and a rear cross rail or sill member 21; the latter all extending transversely under the pan and being fixedly secured thereto, such as by spot welding. Some of these cross members, such as the front rail 18, the frontmost intermediate rail 19 and the rear sill 21 are typically fixedly secured to the vehicle frame (not shown) in a conventional manner.

The bed assembly 12 also normally includes secondary bed or floor pan members 22, the latter being positioned adjacent and fixedly joined to opposite longitudinal edges of the main floor pan 17 so as to occupy the regions of the bed disposed forwardly and rearwardly of the wheelwell housings 14.

In the pickup box as conventionally constructed, the main floor pan 17 is provided with stiffening ribs 23 which project upwardly from the pan, with a plurality of such ribs being generally uniformly sidewardly spaced apart across the width of the pan and extending longitudinally of the pan over a majority of the length thereof. These ribs, which are deformed upwardly from the pan to define a downwardly-opening channel-like cross section, generally extend rearwardly from adjacent the front free edge of the main pan 17 but the ribs normally terminate in tapered rib ends 24 which merge downwardly into the planar profile of the pan 17 at a location disposed close to but spaced forwardly a small distance from the rear free edge 25 of the pan. The rear edge portion of the main pan 17, namely the flat portion thereof which is free of the ribs, is then normally seated within a shallow recess formed in the top wall of the rear sill member 21 so as to be substantially flush with the upper surface of the sill member, with the rear pan and sill member then being suitably fixedly secured together, such as by spot welding. This arrangement enables the groovelike regions defined between adjacent ribs 23 to freely open outwardly through the rear end of the bed assembly, and hence prevent creation of pockets or recesses which would collect dirt or moisture. The secondary pan members 22 also conventionally have stiffening ribs 23 formed therein and extending longitudinally of the bed, with the stiffening ribs 23 in the secondary pan members 22 again typically terminating short of the front and rear edges of the respective pan member.

FIG. 2 illustrates therein another conventional prior art box of a vehicle, such as a pickup truck, wherein the parts thereof corresponding to FIG. 1 have been identified by the same reference numerals but with the addition of a prime (') thereto. The bed assembly 12' of FIG. 2 again includes an enlarged main bed member or portion 17' which extends longitudinally throughout the length of the bed and defines the region which extends generally transversely between the wheelwell housings of the vehicle. The bed assembly 12' also again includes secondary bed members or portions 22' which occupy the regions of the bed disposed forwardly and rearwardly of the wheelwell housings 14. In this prior art construction, however, the main bed portion 17' and the secondary portions 22' are all integrally formed in one piece and, as is generally conventional, are provided with downwardly depending flanges which project generally longitudinally along the side edges and also along the edge of the wheelwell openings for permitting securement to the adjacent side panels or wheelwell housings. The stiffening ribs associated with both the main and secondary portions 17' and 22', respectively, again are formed such that the ends thereof terminate in longitudinally spaced relation from the longitudinal end edges, particularly the rear edge of the bed.

A bed assembly having the structure described above has, for a very long time, been constructed using individual members which have been stamped utilizing large forming presses. That is, the floor pan 17 (FIG. 1) or 17', 21' (FIG. 2) as well as the cross rails 18, 19 and 21 have been conventionally formed from flat steel sheets by positioning a precut steel sheet in a forming press which deforms the sheet to define the desired cross section of the finished member. This stamping or press-forming technique, however, even though extensively utilized for many years, possesses recognized disadvantages which have nevertheless been long tolerated in view of the belief that this was the best manner of constructing the bed assembly.

More specifically, the current and almost universally utilized technique of stamping the pan has resulted in limitations which have restricted optimum construction of the pan. For example, to stamp the floor pan 17 of FIG. 1, a large rectangular sheet must be precut in accordance with the size of the desired pan being stamped. The sheet is initially of excess width so as to provide portions along opposite edges of the sheet which can be used for clamping the sheet and holding it in position when the sheet is positioned within the press and subjected to the stamping operation. Further, during the actual stamping operation, the material of the sheet is physically deformed by the stamping die so as to permit creation of the longitudinal ribs. This necessarily results in significant changes in thickness of the sheet material due to the deformation which is caused during the rib formation process. Not only does the sheet undergo significant changes in thickness, but this change in thickness is also of varying amounts at different locations across the rib, or through the cross section of the sheet containing the ribs, so that the resulting stamped floor pan has a sheet thickness which has significant variation therein. This thickness variation can in some instances be as much as 40% to 50%. This stamping process has also been observed to result in bends or corners which are inconsistent in terms of both material thickness and included angle, and have provided a finished exterior appearance which permits such irregularities to be visually observed. This stamping operation also requires, after the pan has been stamped, that the pan be subjected to a further stamping or cutting operation which is effective for removing the clamping strip portions on opposite sides of the sheet, which strip portions are disposed of as scrap.

In view of the inherent but inconsistent thickness reductions which occur during forming of the pan by the stamping or pressing process, the pan must also be initially formed from a sheet material of greater thickness than desired so as to compensate for the expected thickness reductions which occur during the stamping operation. This increases the overall weight of the pan. Further, in view of the significant size of the main floor pan and the fact that it is deformed or stamped in basically a single pressing operation, this also necessitates utilization of an extremely large and high capacity forming press in order to accommodate both the size of the sheet and the significant pressing force encountered during the simultaneous deformation of the numerous ribs which extend longitudinally thereof. Further, these stamping operations necessarily can normally be successfully carried out only if lower strength and softer sheet steels are utilized since harder strength steels will typically split or crack if subjected to severe deformation of the type encountered in the conventional pan stamping operation.

The floor pan 17', 21' of FIG. 2 is basically formed in the same manner described above relative to the floor pan 17 of FIG. 1 in that it is typically formed by stamping in a large press from a single large precut rectangular sheet, which precut sheet also has the wheelwell openings precut in the sides thereof prior to stamping of the sheet in the forming press. This pan 17', 21', however, obviously experiences the same problems and deficiencies which result from this type of forming operation as described above.

In addition, when the pan of FIG. 2 is formed in a press, the securing flanges along the side edges and around the wheelwell are also press formed, either simultaneous with the overall pressing of the ribbed pan or in a subsequent pressing operation. In this pressing operation, the flanges are bent downwardly, and this has been observed to create manufacturing disadvantages in both the finished product and in the assembly thereof to the vehicle. For example, during this downward bending, the flange is basically swung in a cantilevered fashion about its hinge connection to the main pan member, and this results in undesired weakening due to thinning of the sheet material directly at the hinge point, and possible cracking. Further, since the flange typically extends substantially continuously along and around the wheelwell opening, the flange also tends to buckle at various points, and this causes undesired distortions in the flange. Even more significantly, this bending of the flange makes it difficult to position the flange accurately in downwardly perpendicular relation to the sheet, and in fact there is a well observed and known tendency for the flange to spring back when the bending force is removed, thereby making it difficult to achieve the desired accuracy of perpendicularly of the flange with respect to the sheet. This lack of accurate perpendicularly consequently often makes it difficult for the flanges to be properly fit against and be welded to a wheelwell housing.

To improve on the above-described vehicle bed structure and forming method thereof, the Assignee of this application developed the improved truck bed structures and forming methods disclosed in U.S. Pat. Nos. 5,188,418, 5,544,932 and 5,575,525, and copending U.S. application Ser. No. 08/661,062, all of which are assigned to Pullman Industries, Inc., the Assignee hereof, and are all herein incorporated by reference.

In the aforesaid patents, a truck bed is disclosed including a floor pan having strengthening ribs constructed by a roll-forming process. A rear sill member cooperates with the rear edge of the floor pan and has upward protrusions which interfit within and generally close the rearward ends of the ribs formed in the pan, whereby the ribs are capable of extending to the rear free edge of the pan and open longitudinally outwardly thereof to permit roll forming of the pan while facilitating proper water drainage from the bed when the pan is assembled in the vehicle, with the rear edge of the pan and specifically the ribs thus being supported and reinforced by the rear sill and the protrusions thereon.

In a continuing effort to improve on the truck bed disclosed in the aforementioned patents, the aforementioned copending application additionally discloses that the rear free edge of the ribbed roll-formed floor pan can be formed with a down-turned reinforcing flange extending longitudinally along the rear free edge, which flange projects downwardly so as to effectively overlap rear surfaces defined on the protrusions and rear sill to thus provide additional reinforcement directly at the rear free edge of the pan or bed.

The improved roll-formed bed arrangement as briefly summarized above, and specifically as disclosed in the aforementioned patents, was developed primarily to permit forming of a bed assembly in a manner similar to that illustrated in FIG. 1. That is, the roll-formed bed member disclosed in the aforementioned patents was intended primarily to be the main central pan member equivalent to the main pan member 17 of FIG. 1, whereby separate secondary pan members equivalent to the secondary pan members 22 of FIG. 1 would then be used in conjunction with the main pan member, which secondary members could be formed either by roll forming or by stamping. Manufacture of the main pan member 17 by roll forming, as disclosed in the aforementioned patents, was believed to be the most satisfactory approach for using roll forming in association with a vehicle bed so as to minimize and avoid unnecessary subsequent forming operations, such as stamping operations, which were considered to be of questionable feasibility if such forming operations had to be carried out subsequent to the roll forming of the ribbed pan member. While the aforementioned patents broadly suggest roll forming of the main and secondary pans as an integral one-piece member and the subsequent processing thereof to create wheelwell openings, nevertheless the aforementioned patents do not teach how such could be accomplished and, in view of the additional difficulties presented by this proposal, significant additional development and design is and was required in order to go beyond the broad suggestion of these patents.

Accordingly, it is an object of this invention to provide an improved vehicle bed assembly, specifically a truck bed assembly, and a method of manufacturing and assembling the primary components of the truck bed assembly, so as to overcome many of the disadvantages associated with the conventional and long-utilized stamp bed assemblies as described above, and so as to also provide further improvements over the roll-formed bed assemblies disclosed in the Assignee's aforementioned patents.

More specifically, the present invention relates to an improved vehicle bed assembly, and process of manufacture, which involves formation of a one-piece floor pan by roll forming, which floor pan has a main central pan portion as well as secondary or wing portions which are positionable forwardly and rearwardly of wheelwell openings formed in the pan adjacent opposite side edges thereof. The floor pan has strengthening ribs which extend longitudinally throughout the entire length thereof so as to terminate at the front and rear edges. The strengthening ribs extend in parallel relationship longitudinally throughout not only the main pan portion, but also longitudinally of the secondary portions, whereby these ribs terminate directly at front and rear edges of the wheelwell openings. The one-piece floor pan has the wheelwell openings formed therein, as by a controlled notching or punching operation, after the pan has been roll formed from flat sheet material, and the notching operation provides a series of flanges around the periphery of the wheelwell opening, both along the longitudinal inner edge and also on the front and rear edges thereof. The flanges are disposed in spaced relation, with some of the flanges being coplanar with top walls of the stiffening ribs, and others being coplanar with the bottom or base wall of the pan between the stiffening ribs. The roll-formed pan is subjected to a subsequent forming operation which causes the flanges to be wiped downwardly generally into a transverse or perpendicular relationship with respect to the plane of the base wall of the pan so that the flanges are positionable in adjacent and overlapping relationship to the truck inner side wall or wheelwell housing for securement thereof, such as by welding. The roll-formed ribs extend longitudinally of the pan and thus terminate not only at the rear free edge thereof, but also at the front and rear edges of the wheelwell openings.

In the preferred construction of the invention, as briefly summarized above, the rear of the one-piece pan is positioned on a rear support sill or channel member which extends transversely of the vehicle adjacent the rear of the bed. This sill preferably incorporates upper protrusions in spaced relationship therealong, which protrusions project upwardly into the rearward free ends of the stiffening ribs to support and reinforce the stiffening ribs directly adjacent the rearward free ends thereof.

The improved pan or bed member, as aforesaid, preferably provides the stiffening ribs in uniformly sidewardly-spaced relationship transversely across the main pan portion, with the ribs preferably having top walls of substantial transverse width to define the direct load-bearing surface of the bed assembly. The sidewardly spacing between adjacent ribs is typically selected so that the spacing, as defined by the base wall of the pan, is generally no greater than and preferably less than the transverse width of the top wall of the stiffening ribs to maximize the upper surface area defined by the top walls of the ribs. The configuration of the pan member and specifically the roll-formed rib pattern therein, however, is preferably selected so that the longitudinally-extending inner edge of the wheelwell is formed in a base wall as defined between two sidewardly adjacent ribs. Further, the base wall containing the longitudinally-extending inner edge of the wheelwell is, in a preferred embodiment, provided with a greater transverse width than the base walls between the other ribs so as to facilitate the creation of a flange along the longitudinally inner edge of the wheelwell, which flange can initially be formed from and coplanar with the base wall, and then subsequently deformed downwardly in generally perpendicular relationship therewith to facilitate the overall forming of the pan.

In the improved bed assembly of this invention, as aforesaid, the one-piece bed member is also preferably provided with at least two downwardly-projecting cantilevered securing flanges integrally associated with each of the front and rear edges of each wheelwell opening. These two cantilevered flanges are disposed in sidewardly-spaced relation and are of different lengths, with a longer one of the flanges being integral with the top wall of a stiffening rib which intersects the wheelwell opening, and the other flange being of shorter extent and integral with a base wall which intersects the wheelwell opening. These flanges when deformed downwardly both terminate at about the same elevation and permit securement to the vehicle, such as direct securement to the wheelwell housing.

The present invention also relates to an improved process for forming the vehicle bed, as aforesaid, specifically a one-piece roll-formed ribbed bed member having wheelwell openings formed in opposite side thereof, as well as the process for securing the bed member to the support rails and rear sill as well as other vehicle components to effectively define an assembled bed assembly.

The present invention, in addition to the improvements and advantages briefly summarized above, is also believed to provide manufacturing economies with respect to the overall manufacturing process, and permit creation of cross sections or shapes in the bed and specifically in the pan member which are not possible with stamping or press-forming operations, including the creation of sharper corners having a higher consistency with respect to both curvature and thickness.

Other objects and purposes of the invention will be apparent to persons familiar with structures and processes of this general type upon reading the following specification and inspecting the accompanying drawings.

Figure 1:
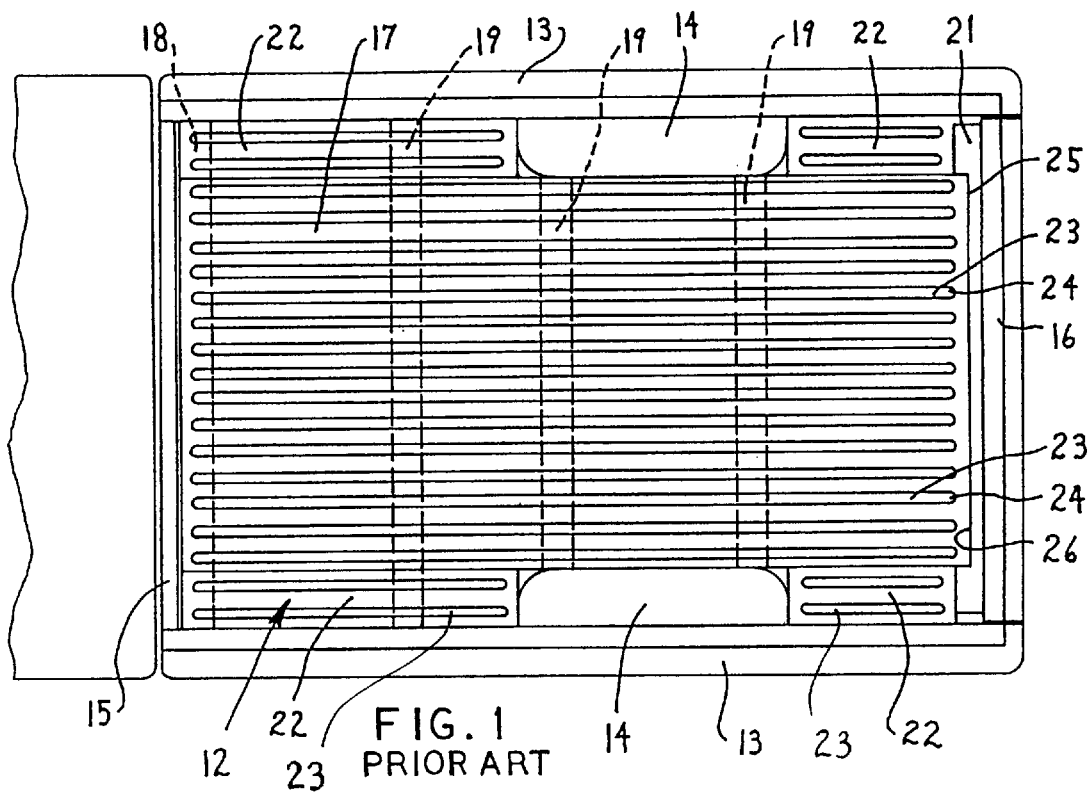
FIG. 1 is a top plan view of a conventional pickup truck box which illustrates a first well know construction of a bed assembly.
Figure 2:
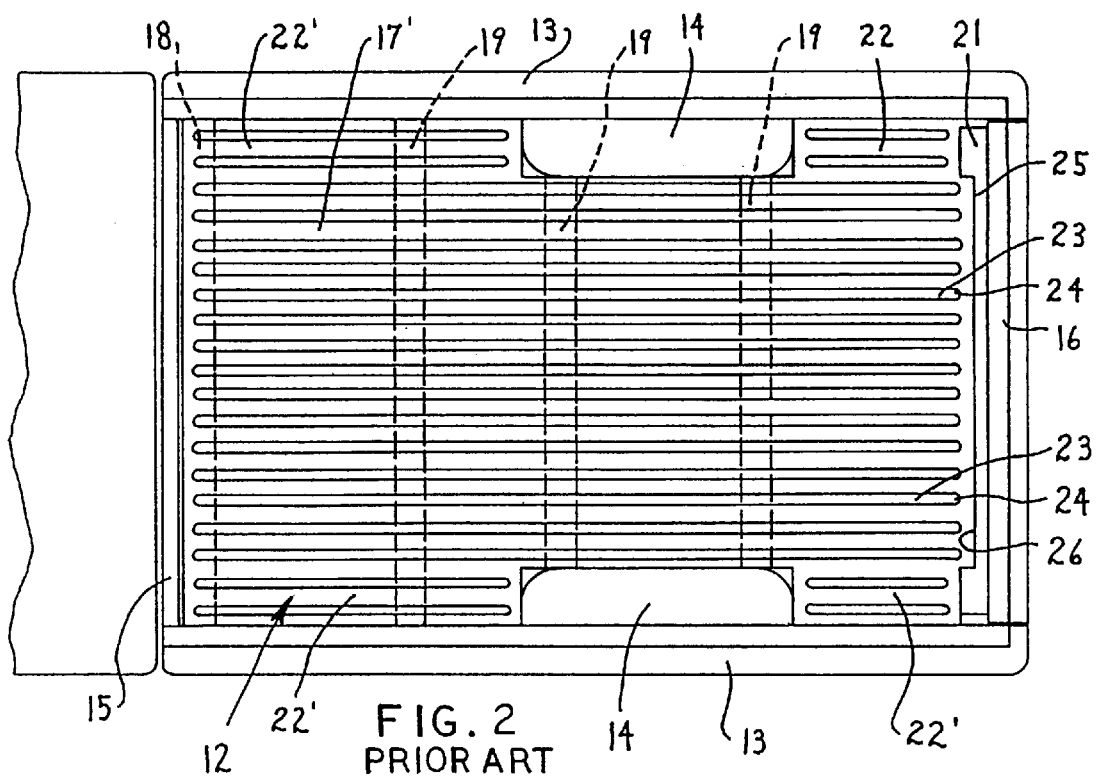
FIG. 2 is a top plan view similar to FIG. 1 but illustrating a second well known construction of the bed assembly.

Certain terminology will be used in the following description for convenience in reference only, and will not be limiting. For example, the words "upwardly", "downwardly", "rightwardly" and "leftwardly" will refer to directions in the drawings to which reference is made. The word "upwardly" will also be used in reference to an exposed top surface of the floor pan of the bed assembly. The words "inwardly" and "outwardly" will refer to directions toward and away from, respectively, the geometric center of the box or bed assembly, or designated parts thereof. Said terminology will include the words specifically mentioned, derivatives thereof, and words of similar import.

DETAILED DESCRIPTION

The improved vehicle bed assembly of the present invention will now be described, particularly with reference to FIGS. 3–9.

Figure 3:
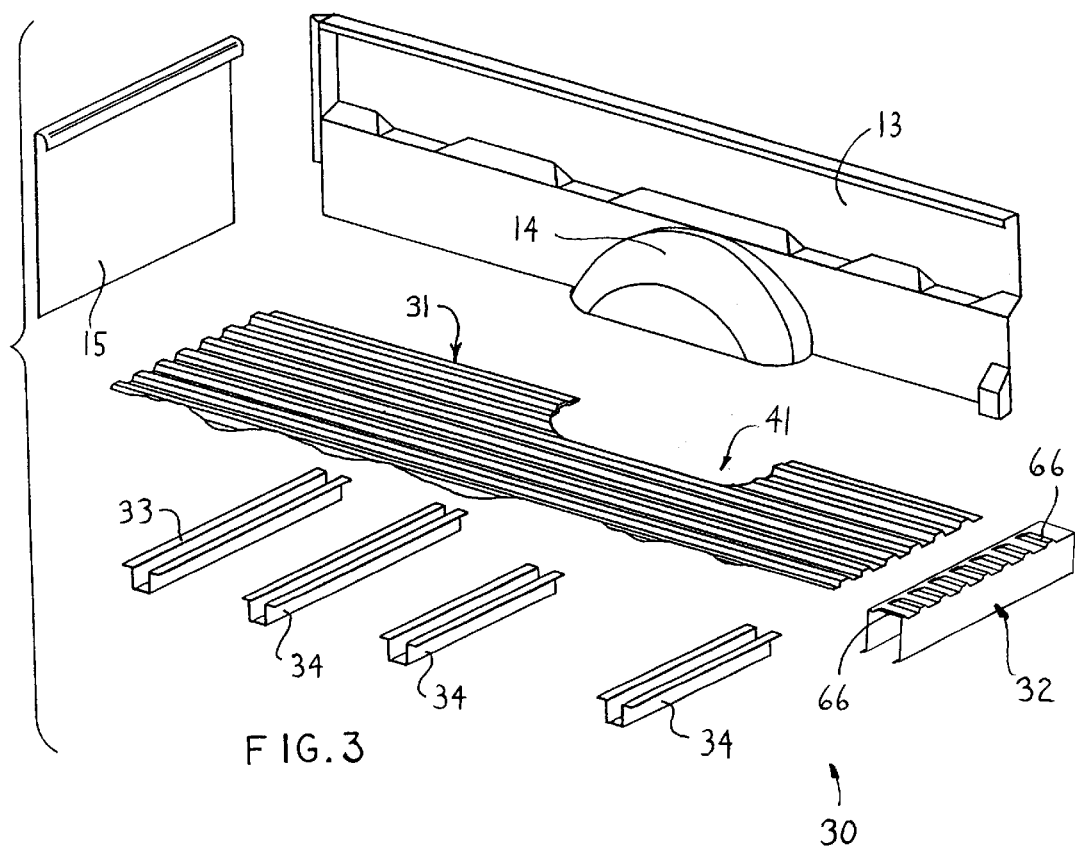
FIG. 3 is an exploded perspective view illustrating the basic components which cooperate with the improved pan member of this invention so as to define the improved bed assembly of this invention.
Figure 4:
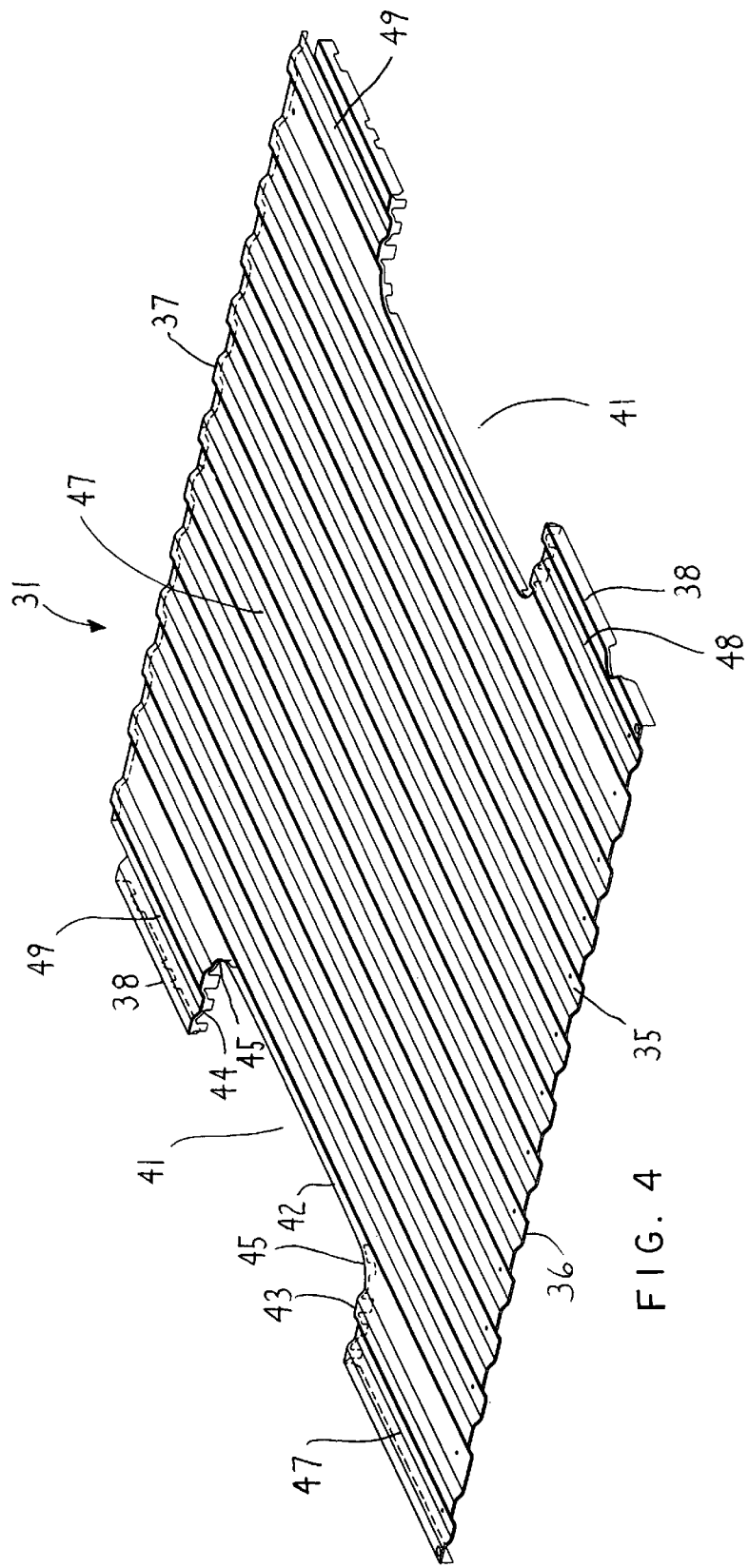
FIG. 4 is a perspective view which illustrates the improved one-piece floor pan according to the present invention.

The floor or bed assembly 30 of the invention, as illustrated specifically by FIGS. 3 and 4, employs a main floor pan or bed member 31 which cooperates with and has the rear edge thereof supported on a rear cross rail or sill member 32, the latter extending transversely across the vehicle bed adjacent the rear end thereof. The pan or bed member 31 is also supported adjacent the front edge thereof on a front cross member or rail 33, and several (three in the illustrated embodiment) intermediate cross rails 34 are also fixedly secured under the bed member 31 in parallel but spaced relation between the front and rear cross rails. This general arrangement is conventional.

The floor pan or bed member 31 is formed, preferably roll formed as described hereinafter, from a thin sheet 35 of metal, preferably high strength steel having a thickness of about 0.8 mm, so that the pan member 31 is of an integral and monolithic one-piece construction with the pan member having substantially uniform thickness throughout the entire transverse and longitudinally cross sectional extent thereof.

The one-piece monolithic pan member 31, following its being longitudinally roll formed and cut to length, is of a generally horizontally enlarged rectangular configuration and has front and rear free edges 36 and 37, respectively, extending transversely of the longitudinally-extending (i.e., front to back) direction of the pan member. The pan member additionally has generally parallel side edges 38 which extend longitudinally and substantially perpendicularly intersect the respective front and rear free edges.

Figure 9:
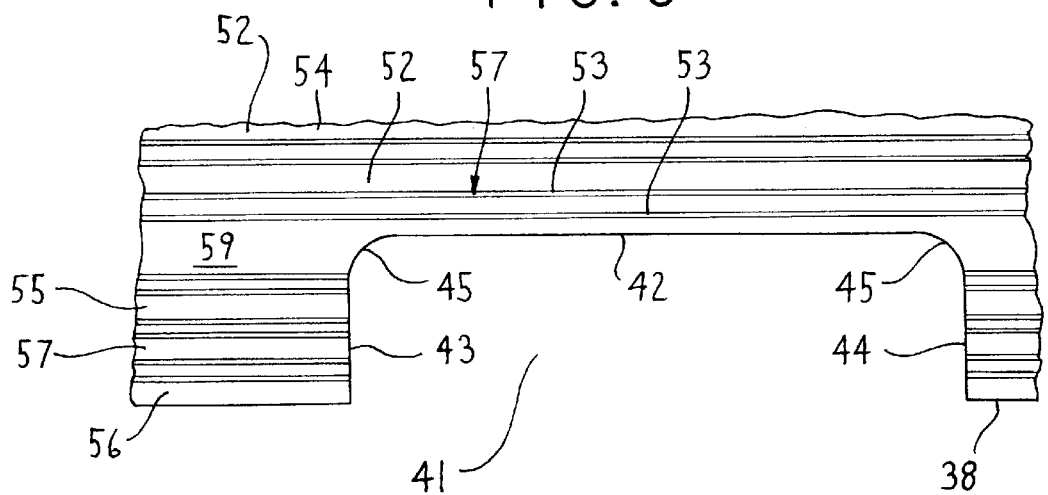
FIG. 9 is a fragmentary top view corresponding to FIG. 8 but showing the one-piece pan member subsequent to a wiping operation which causes the securing tabs both along the side edge of the pan and the side edge of the wheelwell opening to be deformed downwardly for deposition substantially as illustrated by FIG. 5.

The rectangularly-shaped roll-formed pan member 31, as generally described above, has a pair of wheelwell openings 41 formed therein subsequent to the roll forming of the pan member. The wheelwell openings 41 are typically disposed intermediate the front and rear edges of the pan member, and open inwardly from the respective side edges 38 so that the pair of wheelwell openings are transversely aligned relative to the longitudinal direction of the bed member. Each wheelwell opening 41 has a configuration so as to receive therein the wheelwell housing 14 associated with the respective vehicle side wall 13. The wheelwell opening 41, as illustrated in FIGS. 4 and 9, has an inner edge 42 which is elongated generally longitudinally of the bed member and which joins to respective front and rear edges 43 and 44 which project transversely outwardly and intersect the side edge 38 of the bed member. The front and rear edges 43 and 44 are joined to the inner edge 42 through arcuate or rounded edges or corners 45. The exact shape of the wheelwell opening 41 will, of course, vary depending upon the overall vehicle construction, but will generally have a configuration similar to that described above.

The monolithic one-piece bed member 31, when the wheelwell openings 41 are formed therein, thus includes a main central bed section 47 which extends longitudinally between the respective front and rear edges 36 and 37, and also extends transversely between the inner edges 42 of the sidewardly-spaced pair of wheelwell openings 41. The monolithic one-piece bed member 31 also includes front and rear secondary or side bed sections 48 and 49, respectively, which are respectively positioned forwardly and rearwardly of the wheelwell openings 41. The front secondary bed sections 48 are integrally joined to and project transversely from the main bed section 47 and extend longitudinally between the front edge 36 of the bed member and the front edge 43 of the respective wheelwell opening 41. The rear secondary bed sections 49 are also integrally and monolithically joined to and project transversely from the main bed section 47 and extend longitudinally of the bed member from the rear edge 44 of the respective wheelwell opening 41 to generally the rear edge of the bed member. These secondary bed sections 48 and 49 define thereon the longitudinally-extending side edges 38 of the bed member 31.

The bed member 31, due to the deforming thereof by longitudinal roll forming, has a plurality of longitudinally-elongate stiffening ribs 51 projecting upwardly from the plane of the thin sheet 35. A plurality of substantially identical such ribs 51 are generally uniformly sidewardly spaced apart in the transverse or widthwise direction of the main or central pan section 47, with the ribs 51 extending longitudinally of the pan 31 in generally parallel relationship. The ribs 51 have a generally inverted channel-like or U-shaped cross section, whereby each adjacent pair of ribs 51 define an elongate valley 50 therebetween, the base or bottom of the valley being defined by the original planar thin sheet 35. The ribs 51 project longitudinally throughout the entire length of the pan member 31 so as to terminate at the respective front and rear edges 36 and 37 thereof. These ribs provide the central floor pan section 47 with a substantially uniform transverse corrugated cross section throughout the entire longitudinal extent thereof.

Figure 7:
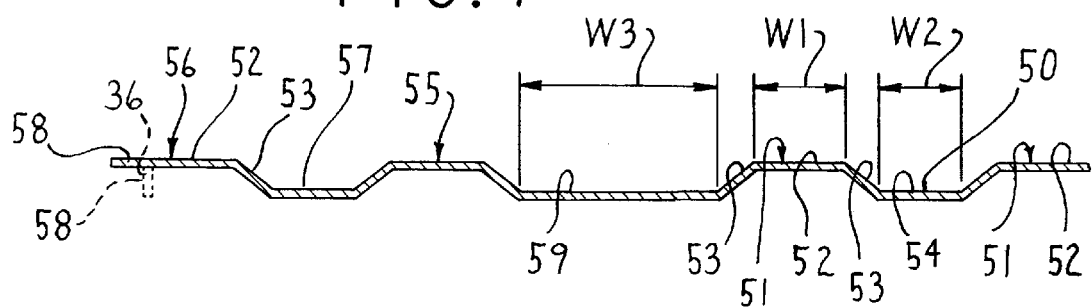
FIG. 7 is a fragmentary sectional view taken generally along line 7—7 in FIG. 6.

As illustrated by FIG. 7, each rib 51 has a generally flat longitudinally-extending top wall 52 which extends transversely between and is joined to a pair of downwardly-projecting side walls 53, the latter pair of side walls preferably diverging with respect to one another as they project downwardly in sloped or angled relation relative to the respective top wall 52. These side walls 53 define sides of the respective valleys 50 which extend longitudinally of the pan member between adjacent ribs 51, and the bottom of the valley is defined by a base wall 54 which extends longitudinally between the front and rear free edges of the pan member and which also extends transversely between and integrally and monolithicly joins to the lower edges of side walls 53 associated with two adjacent ribs 51.

Figure 7A:
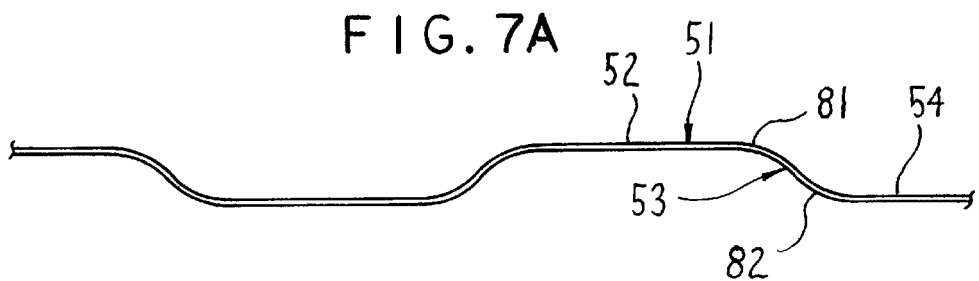
FIG. 7A is an enlarged fragmentary sectional view similar to FIG. 7 but illustrating the preferred corrugated cross sectional configuration of the pan achieved by roll forming of the pan according to the present invention.

While FIG. 7 generally illustrates the corrugated roll-formed cross sectional configuration of the floor pan 31, reference is made to FIG. 7A which more accurately illustrates the preferred corrugated cross section of the floor pan 31 which can be desirably achieved when the pan is roll formed in accordance with the present invention. By roll forming of the floor pan 31, it has been discovered that the side walls 53 which connect the top walls 52 and the base walls 54 need not be flat such as is conventionally required when the ribs are formed in a press, but rather the roll forming enables the side walls 53 to have a generally smoothly-curved S-shaped vertical configuration so as to provide a much more desirable transition between the top and bottom walls 52 and 54. The side wall 53 specifically includes an upper portion 81 which is of a generally circular arcuate convex configuration and a lower portion 82 which is also of a generally circular arcuate convex configuration, with these portions 81 and 82 being reversely oriented relative to their centers of radii, and effectively defining a smooth transition between the upper and lower walls. The upper arcuate part 81 specifically is formed so as to tangentially join to the upper wall at one end, and at its other end substantially tangentially joins to the upper end of the lower arcuate wall part 82. This lower arcuate wall part at its lower end then in turn tangentially joins to the lower wall 54. In this fashion, the side wall 53 in effect does not include any planar or straight portion in the vertical extent thereof, and the creation of the wall parts 81 and 82 by the rolling forming technique wholly eliminate sharp corners or bends and maintains uniform thickness of material throughout the cross section of the bed member. The radii defining the arcuate wall parts 81 and 82 are preferably substantially equal, and this radius will preferably have a magnitude which is about one-half the height of the rib 51, which magnitude is also many times (for example, at least an order of magnitude) greater than the thickness of the sheet material thickness.

In a preferred construction of the invention, the top walls 52 of ribs 51 preferably have a transverse width W1 which is at least equal to and more preferably greater than the transverse width W2 of the valley base walls 54. This thus permits the overall planar support area defined by the summation of the top walls 52 to be of significant magnitude to thus facilitate utilization of the vehicle bed since the upper surfaces of these top walls 52 thus effectively define the load-engaging plane of the bed member.

Figure 6:
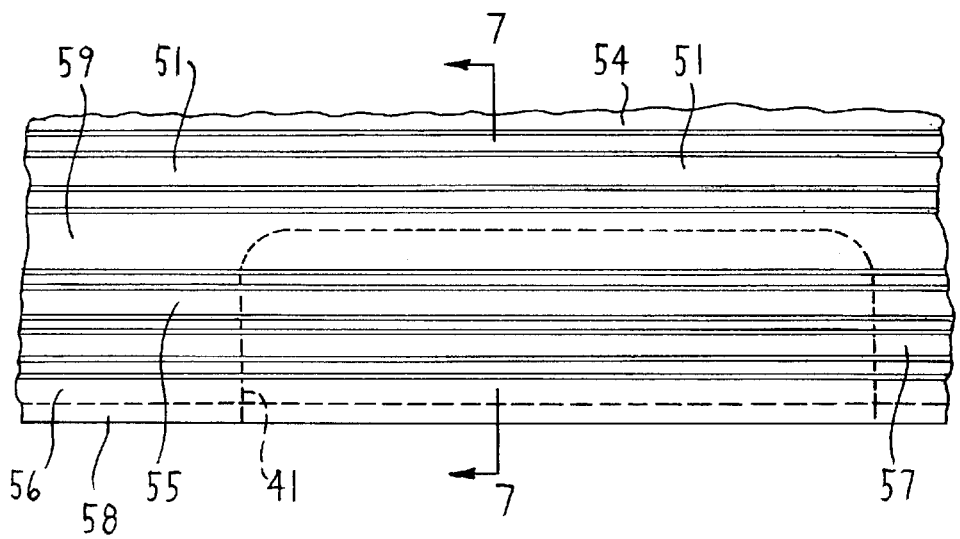
FIG. 6 is a fragmentary top view of one side portion of the one-piece pan member subsequent to roll forming thereof, but prior to notching of the wheelwell opening therein.
Figure 8:
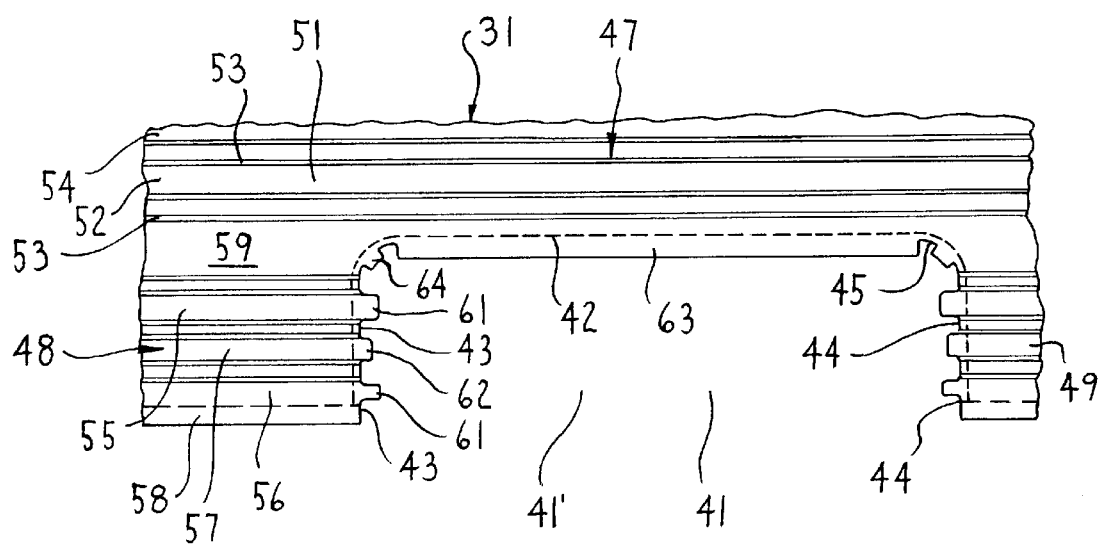
FIG. 8 is a fragmentary top view corresponding to FIG. 6 but showing the pan member subsequent to a notching operation which simultaneously effects formation of the wheelwell opening as well as formation of securing tabs at locations along the periphery of the wheelwell opening.

The side or secondary pan portions 48, 49 are also roll formed so as to have upwardly-projecting stiffening ribs associated therewith and projecting longitudinally of the pan member in generally parallel relationship with the stiffening ribs 51 associated with the central pan section 47. In the illustrated embodiment the side or secondary sections 48, 49 are provided with two sidewardly-spaced stiffening ribs, namely an intermediate stiffening rib 55 and an edge stiffening rib 56. These ribs 55 and 56 are roll formed into the pan member 31 simultaneously with the forming of the ribs 51, and the ribs 55 and 56 extend longitudinally and continuously between the front and rear edges of the pan member 31 prior to forming of the wheelwell openings 41 therein, substantially as illustrated by FIGS. 6 and 7. These ribs 55 and 56, however, after forming of the wheelwell opening 41 in the pan member, terminate at the front and rear edges of the wheelwell opening substantially as illustrated by FIGS. 8 and 9.

The intermediate rib 55 may be similar in shape and size as the ribs 51 and is disposed adjacent and sidewardly-spaced from the edge rib 56 through an intermediate base wall 57 connected therebetween, which base wall 57 is coplanar with and generally similarly corresponds to the base walls 54 described above. The edge rib 56, in the illustrated embodiment, has a side wall 53 associated with only one side thereof, and the top wall 52 of the edge rib 56 defines the longitudinally-extending side edge 38 of the finished pan member 31. This top wall 56, however, prior to forming of the wheelwell openings, has a flange 58 which is a monolithic and integral coplanar extension of the top wall 52, which flange 58 is subsequently bent generally perpendicularly downwardly as indicated by dotted lines in FIG. 7 so as to define a securing flange 58 for attachment to the vehicle side wall 13.

The intermediate rib 55 is transversely joined to the transversely adjacent rib 51 of the central pan section 47 by a base wall 59 which extends longitudinally between the front and rear edges of the pan member and is generally coplanar with the other base walls 54 and 57. This base wall 59, however, preferably has a transverse width W3 which is significantly greater than the transverse width W2 of the base walls 54. In fact, the width W3 will preferably typically be at least about 1.5 times the width W2 and in fact may be as much as about 2.0 times the width W2.

As illustrated by FIGS. 5–6 and 8–9, the longitudinally-extending base wall 59 has the longitudinally-extending inner edge 42 of the wheelwell opening 41 formed therein, and the increased transverse width W3 of this base wall 59 facilitates the forming of the inner edge 42 therein, together with securing flanges which are subsequently deformed downwardly from the base wall 59 for securement to the wheelwell housing 41.

Figure 5:
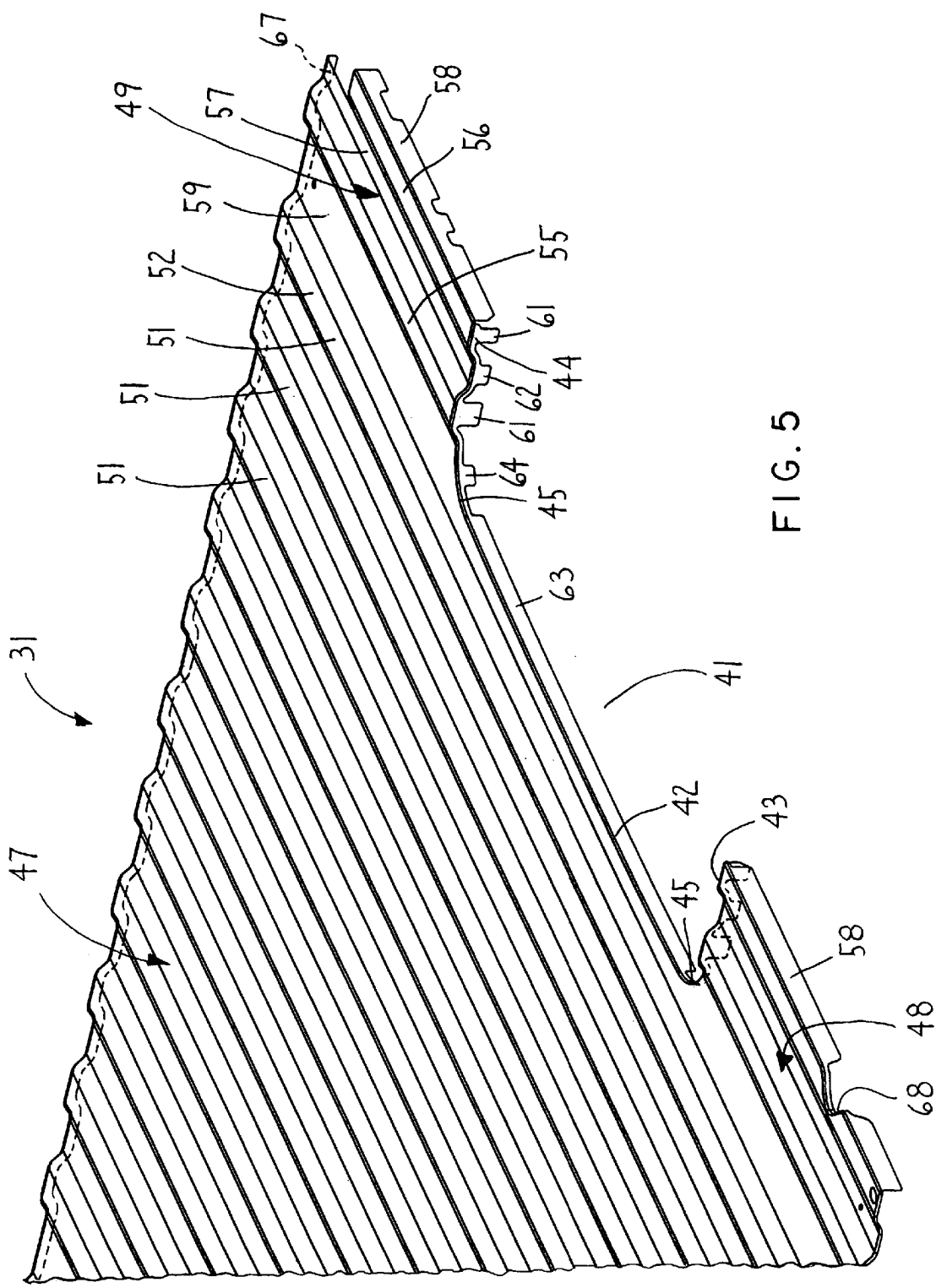
FIG. 5 is an enlarged fragmentary perspective view of a portion of FIG. 4 and specifically illustrating that part of a one-piece pan member having a wheelwell opening formed therein.

More specifically, and as illustrated by FIG. 8, the one-piece longitudinally-ribbed roll-formed pan member as illustrated in FIG. 6 is thereafter subjected to a notching operation which is for the purpose of forming the wheelwell openings 41 therein. This notching or punching operation initially results in formation of a modified wheelwell opening 41', the edges of which are interrupted by cantilevered flanges or tabs which project generally horizontally coplanar from the pan member into the wheelwell opening. These flanges and tabs are then subsequently deformed downwardly in generally perpendicular relationship to the plane of the respective top and base walls of the pan member so as to provide the finished wheelwell opening 41 substantially as illustrated by FIGS. 5 and 9.

Referring again to FIG. 8, the forming of the modified opening 41' in the side portion of the pan member results in the forming of a cantilevered flange 61 which is coplanar with the top wall 52 of the edge rib 56. The tab 61 projects longitudinally of the respective rib away from the respective front and rear wheelwell opening edges 43 and 44 so as to project into the region which will ultimately define the wheelwell opening 41. Similar and substantially identical flanges 61 are also coplanar with and integrally joined to the top wall of the intermediate ribs 55 and project longitudinally thereof beyond the wheelwell opening edges 43 and 44 into the region of the wheelwell opening 41. The intermediate base wall 57 also has a flange 62 integrally attached thereto and disposed in coplanar relationship therewith, with the flange 62 also being longitudinally cantilevered outwardly beyond the respective wheelwell edges 43 and 44 so as to project into the wheelwell opening 41. The flanges 62, however, are of shorter cantilevered extent or length than are the flanges 61, as illustrated in FIG. 8. In fact, the flanges 62 typically have a length which is less than the length of the flanges 61 by an amount which approximately corresponds to the height of the stiffening ribs so that when the flanges 61 and 62 are deformed downwardly as illustrated in FIG. 5, the lower free edges of the flanges 61 and 62 will be approximately at the same elevation.

The base wall 59 is also provided with a flange 63 which, after forming of the intermediate opening 41' as illustrated in FIG. 8, is substantially coplanar with the base wall 59 and in fact originally comprises a part of the base wall 59. This flange 63 extends longitudinally a significant extent along the inner edge of the intermediate opening 41', with this flange 63 being transversely (i.e. sidewardly) cantilevered only a relatively small distance. The sideward cantilevered distance approximately corresponds to the cantilevered length of the flanges 62, whereby downward displacement of the flange 63 into the position illustrated by FIG. 5 thus results in the forming of the longitudinally-extending inner edge 42 of the wheelwell opening 41.

The base wall 59, in the illustrated embodiment, adjacent each of the rounded wheelwell opening corners 45, is also provided with a further coplanar and cantilevered flange 64 which is disposed intermediate and spaced from the adjacent cantilevered flanges 61 and 63. The flange 64, due to its being coplanar with the base wall 59, also has a shorter length which generally corresponds to the cantilevered length of the flanges 62 and 63. These flanges 64 are also deformed downwardly into the position illustrated by FIG. 5 so as to define the wheelwell opening 41 as illustrated in FIG. 9, whereby the flanges 61, 62, 63 and 64 are thus all disposed for substantially abutting contact with and securement to the wheelwell housing 14, such as by welding.

The forming of the one-piece monolithic floor pan member 31, as illustrated in FIG. 4, will now be briefly summarized. The floor pan member 31 is preferably formed from thin steel sheet which during the roll forming process is a substantially continuous sheet supplied from a large coil. The width of the steel sheet is selected based on the desired transverse finished dimension of the pan member 31 so as to permit creation of the transversely corrugated floor pan including formation of the side edge flanges 58. The initial width of the flat steel sheet, as provided in the coil, thus substantially corresponds to the width of the finished floor pan member 31 if flattened out into a planar condition.

The flattened steel sheet is supplied from the coil into a roll-forming mill which, in a conventional and known manner, progressively reforms the flat steel sheet as it passes through the mill so that, upon leaving the mill, the steel sheet is longitudinally corrugated so as to have a cross section substantially as illustrated by FIG. 7. The continuous corrugated sheet is then fed to a cut-off press which cuts the continuous corrugated sheet at desired spaced distances corresponding to the desired lengths of the finished floor pan member 31. The separated floor pan member 31 has side portions which are free of wheelwell openings, and hence substantially correspond to FIG. 6. The separate roll-formed pan member is then moved into a forming station which effects notching of the modified wheelwell openings 41' (FIG. 8) into opposite side portions of the pan member, which notching operation effectively removes a side central portion of the corrugated pan member to thereby result in formation of the opening 41'. Following the notching operation the pan member, having the modified wheelwell openings 41' formed in opposite sides thereof, is then subjected to a pressing operation which effects cold working and hence downward deformation of the flanges and tabs 58, 61, 62, 63 and 64 to thereby provide a monolithic one-piece roll-formed corrugated floor pan 31 substantially as illustrated in FIG. 4. This floor pan 31 is thus generally in condition for securement to the cross rails 32, 33 and 34 in a conventional manner, typically by means of spot welds which are provided at the locations where the cross rails contact the base walls 54, 57 and 59.

Figure 10:
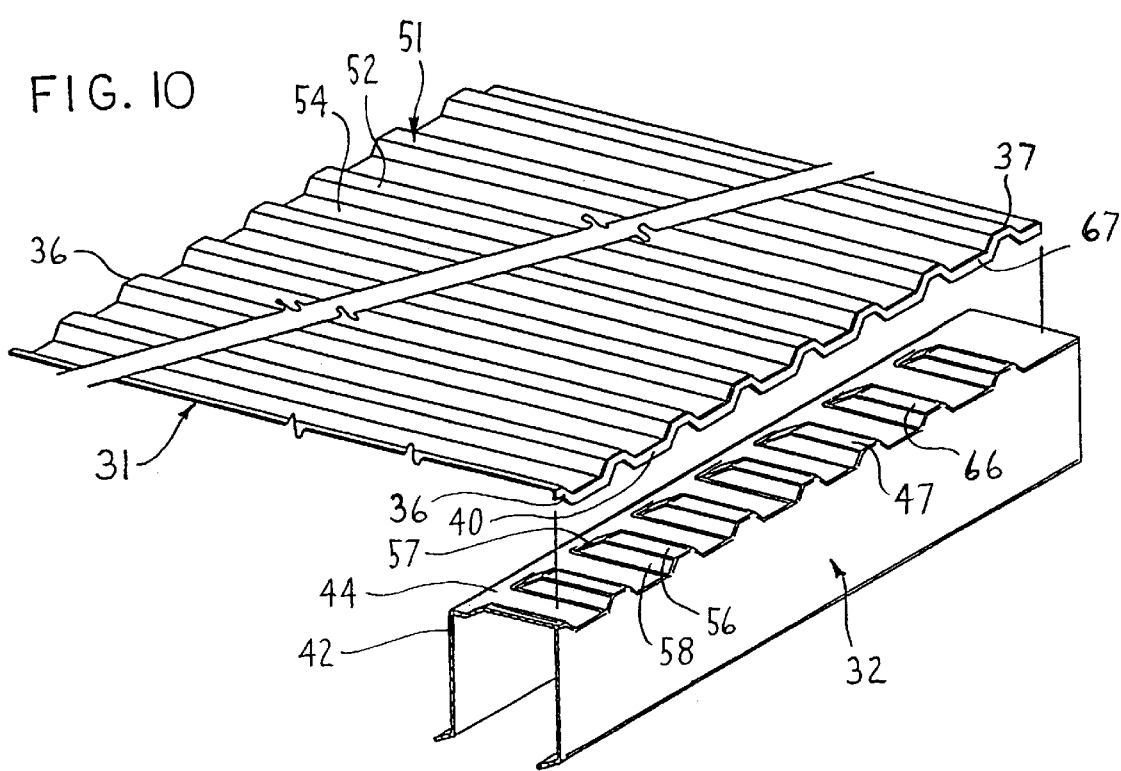
FIG. 10 is an exploded, fragmentary perspective view showing the rear of the pan member and its relationship to the rear sill.

The rear cross rail or sill 32 is preferably provided with a plurality of sidewardly-spaced protrusions 66 projecting upwardly therefrom, which protrusions are sized and positioned so as to project upwardly into the rearward ends of the ribs 51, 55 and 56, preferably directly adjacent the rear free edge of the pan member, so as to close off the rearward ends of the ribs and provide for supportive reinforcement of the ribs directly adjacent the rear edge of the bed. The protrusions 66 and their cooperation with the rear ends of the ribs can be generally in accordance with the disclosures contained in Assignee's prior U.S. Pat. Nos. 5,188,418, 5,544, 932 and 5,575,525 as described above. Alternately, the rearward free edge of the pan member 31 can be provided with a downwardly deformed flange 67 (FIG. 10) associated therewith and extending along the rear edge, which rear flange can overlap rear surfaces on the protrusions 66 and on the rear sill 32 in the same manner as disclosed and described in detail in Assignee's copending U.S. application Ser. No. 08/661,062.

The one-piece monolithic bed member 31 of the present invention, as illustrated by FIGS. 4 and 5, also preferably has a small notchlike opening 68 formed inwardly from one of the longitudinally-extending side edges thereof in longitudinally spaced relation from the respective wheelwell opening 41. This opening 68, which extends vertically through the side flange 58 and at least part of the edge rib 56, is sized so as to accommodate therein the externally-accessible fuel filling pipe which connects to the fuel tank of the vehicle. This notch 68 is preferably notched from the roll-formed pan member simultaneous with the formation of the adjacent notched wheelwell opening 41'.

Figure 11:
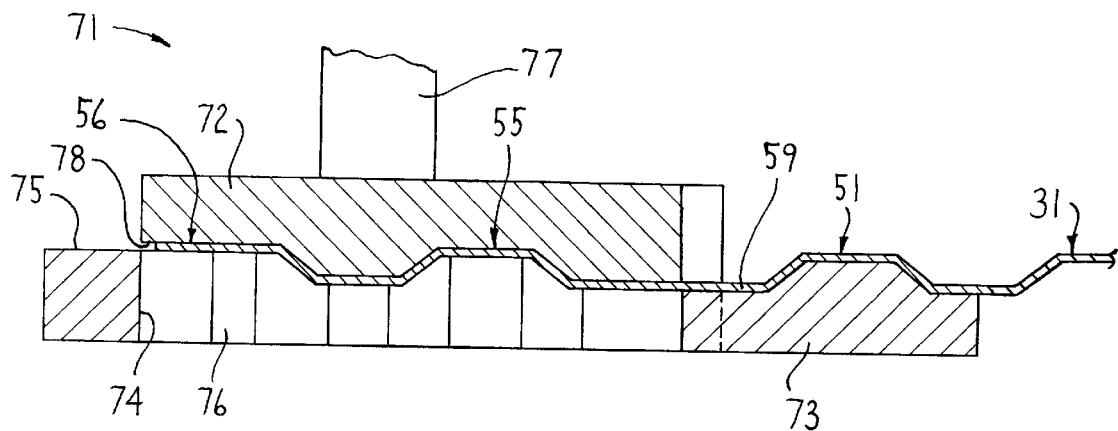
FIG. 11 is a enlarged fragmentary sectional view illustrating upper and lower punch members used for effecting notching of the wheelwell opening in the roll-formed pan member as illustrated in FIG. 8, the cross section of the lower support member being taken generally along line 11—11 in FIG. 12.
Figure 12:
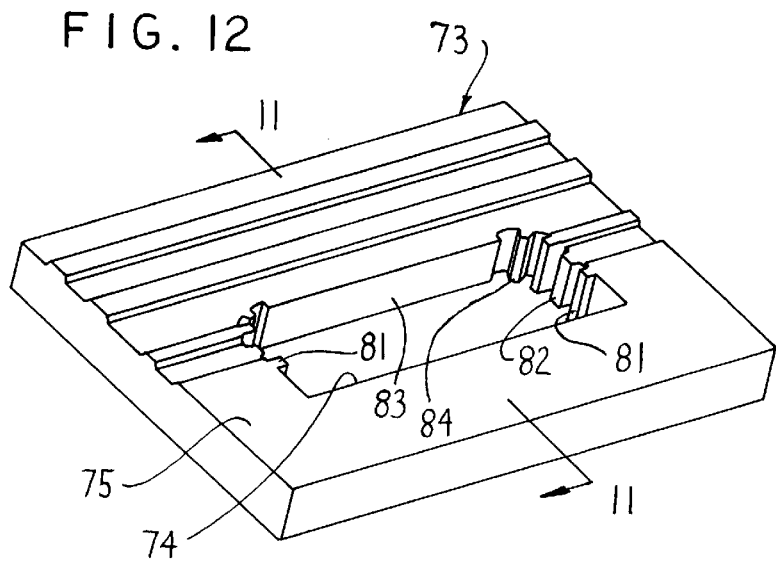
FIG. 12 is a perspective view illustrating the lower support member used in notching the wheelwell opening.

To effect notching of the intermediate wheelwell opening 41' as illustrated in FIG. 8, there is provided a notching arrangement 71 (FIGS. 11 and 12) which is designed specifically to cooperate with the roll-formed corrugated configuration of the pan member. This notching arrangement 71 includes respective upper and lower notch members 72 and 73 which cooperate to effectively sandwiched the side portion of the pan therebetween as illustrated in FIG. 11, prior to actual formation of the opening 41'. The lower member 73 is preferably stationarily supported on a suitable support frame (not shown), and is provided with an opening 74 vertically therein, the configuration of the opening 74 corresponding generally to the configuration of the wheelwell opening 41'. The upper surface 75 of the lower member 73 has a corrugated configuration which generally corresponds to the transverse corrugated or ribbed shape defined by the bottom surface of the pan member adjacent one longitudinally-extending side edge thereof so that the lower member 73, at least adjacent the front and rear edges of the wheelwell opening and also along the longitudinally-extending inner edge thereof, supportively engages the underside of the ribs 55 and 56 as well as the base walls 57 and 59. This lower member 73 also has appropriate cantilevered support tongues 81, 82, 83, 84, which are positioned and shaped corresponding to the flanges 61, 62, 63 and 64, respectively.

The upper notch member 72 is sized and positioned so as to be disposed directly over the opening 74 in the lower member 73, and the upper notch member 72 is connected to a vertical driving device 77 which effects downward movement of the upper member 72 into the opening 74 so as to effect creation of the opening 41'. The upper member 72 has a outer generally U-shaped edge which generally corresponds to the shape of the opening 41' to thus effect shearing or punching of the roll-formed edge portion of the pan member to effect formation of the opening 41'. The bottom surface 78 of the upper member 72 is also provided with a corrugated or ribbed configuration which generally corresponds to the corrugated upper surface of the engaged area of the pan member 31, substantially as illustrated by FIG. 11, so that the downward movement of the upper member 72 effects substantially simultaneous punching of the pan member around the entirety of the opening 41'. The top and base walls, as well as the interconnecting side walls, are thus all substantially simultaneously punched so as to create the opening 41'. This simultaneous notching of the entire non-uniform edge of the opening 41', together with the accompanying supportive engagement provided by the lower member 73 around the entirety of the edge of the opening 41', together with the pressing engagement provided by the upper member 72 around the entirety of the inner perimeter of the opening 41', permits the opening 41' to be accurately formed without creating any significant dimensional change or deformation of the pan member in the vicinity of the opening 41', particularly where the ribs 55 and 56 terminate at the front and rear edges of the wheelwell opening.

Further, by provision of the increased width W3 of the base wall 59 and the positioning of the longitudinally-elongate inner edge 42 of the wheelwell opening therealong, this wider base wall 59 contains sufficient material to also permit formation of the flanges 63 and 64 therefrom, and in fact all of the flanges 61–64 are formed from horizontally planar walls of the pan member, even though sloped side walls 53 of the ribs are sidewardly interposed between some of the flanges, such as the rib side wall which is disposed between the flange 62 and the flanges 61 as disposed on opposite sides thereof.

Figure 13A:
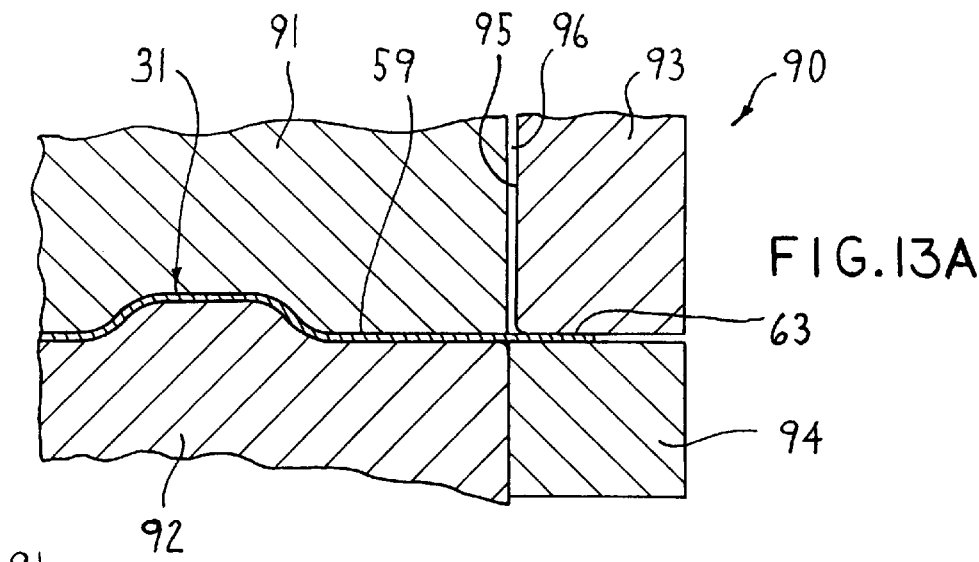
FIGS. 13A, 13B and 13C are fragmentary sectional views which illustrate the process for forming the attachment or securing flanges associated with edges of the roll-formed pan of this invention, with FIG. 13A showing the flange following the roll forming thereof and prior to forming of the flange, FIG. 13B showing the flange in a partially formed position, and FIG. 13C showing the flange in its fully formed position.
Figure 13B:
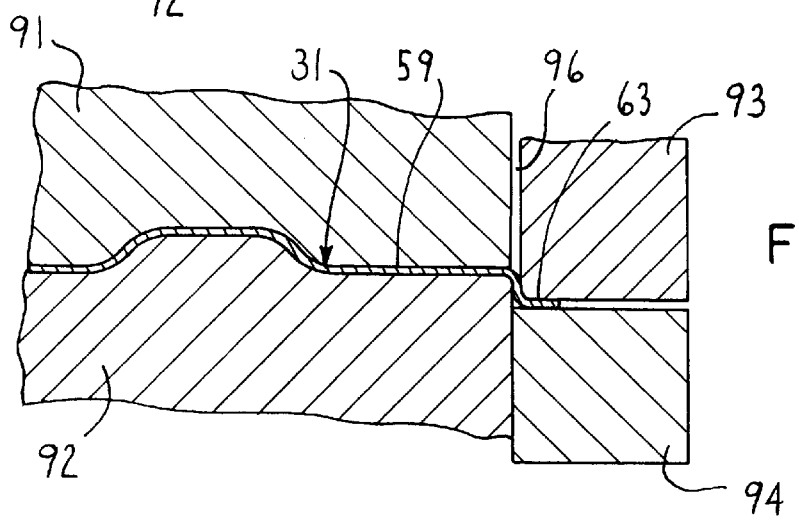
Figure 13C:
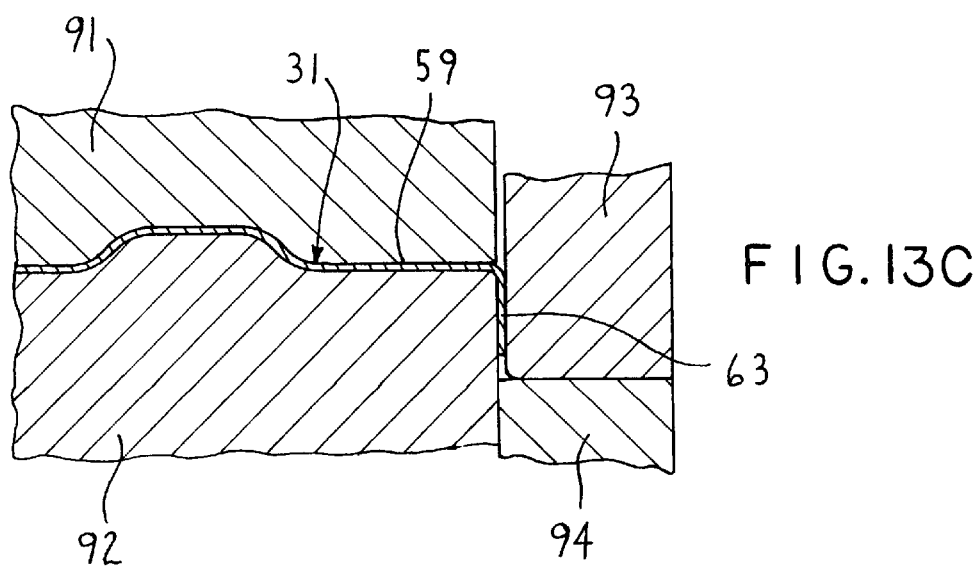

Referring now to FIGS. 13A–13C, there is diagrammatically illustrated the process for forming the edge flanges which are associated with the longitudinal side edges and the wheelwell openings, such as the flanges 58, 61, 62, 63 and 64. FIGS. 13A–13C illustrate the formation of the flange 63 which extends along the longitudinally-extending inner edge of the wheelwell opening, but it will be appreciate that the arrangement and process illustrated by these figures are also applicable to the other flanges.

Referring specifically to FIG. 13A, the roll-formed bed member 31 is positioned in a flange forming apparatus 90 which includes upper and lower supports 91 and 92 which clampingly engage therebetween that portion of the pan member 31 adjacent the flange, such as the flange 63, with the flange being positioned so as to project in cantilevered fashion outwardly beyond the supports 91 and 92. A pair of movable forming or wiping members 93 and 94 are disposed adjacent the supports for supportive engagement with the respective upper and lower surfaces of the projecting flange 63. The flange 63 is closely but transversely slidably confined between the opposed faces of the moveable wiping members 93 and 94, and the upper wiping member 93 has an inner face or surface 96 which is spaced from an opposed side face of the adjacent upper support 91 so as to define a small vertically extending gap 96 therebetween, which gap has a dimension which closely approximates the thickness of the flange 63. To effect downward deformation of the flange into a position wherein it projects downwardly in perpendicular relationship to the plane of the pan member, the wiping or forming members 93, 94 are synchronously moved downwardly by a driving device (not shown) which maintains the opposed faces thereof closely spaced so as to confine the flange 63 therebetween. As these forming members 93, 94 are moved downwardly, however, this downward movement and the presence of the gap 96 are such that the flange 63 starting at its juncture with the main pan member is progressively deformed downwardly along the flange toward the free end thereof, this in actuality being a cold working of the metal similar to a roll-forming technique. The wiping members 93 and 94 are thus moved downwardly through a sufficient stroke until the flange 63 is deformed to its free end or tip and hence effectively is totally pulled out of the gap between the wiping members 93, 94 and assumes an entirely perpendicular relationship as illustrated by FIG. 13C.

With the formation of the flange by actual progressively deforming or cold working the flange from the junction point with the pan, to the tip end of the flange, this thus enables the thickness of the flange including at the corner connection to the pan member to be maintained uniform, and also effectively sufficiently reworks the metal of the flange such that when the pan member 31 is removed from the forming apparatus 90, the flange 63 will accurately retain its downwardly projecting perpendicular relationship and will not experience any significant spring back or deformation due to residual stresses created in the flange.

By forming all of the flanges by means of a deforming cold working process similar to that illustrated by FIGS. 13A–13C, the flanges hence all possess properties which are generally equivalent to the roll-formed properties of the pan, and result in the flanges having a significantly higher degree of dimensional accuracy so as to greatly facilitate the positioning of the pan on the vehicle and the welding of the pan to the vehicle side walls and wheelwell housings due to the accuracy of manufacture achieved by this invention.

While the invention as described above relative to the one-piece monolithic pan 31 contemplates that the roll-formed member will be formed from sheet steel, it will be appreciated that the invention also permits the floor pan member to be formed from laminated sheet material such as sheet steel having a plastic sheet layer laminated over the top thereof since such construction may eliminate the need for a separate bed liner.

It will also be appreciated that while the invention as described above references the upward formation of the stiffening ribs from the flat sheet material, it will be appreciate that the relative deformation of the sheet material and forming of the ribs is such that the original planar sheet material can in actuality define the flat top walls of the ribs, and that the actual deforming of the sheet material can be a downward deformation of the valleys between the ribs.

While the invention has been described for use on and is particularly adaptable for use on a pickup truck, it will be appreciated that the invention is also particularly adaptable for use on other vehicles which require a similar bed construction, such as vans and sport utility vehicles.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vehicle bed assembly having a horizontally enlarged floor constructed from thin structural sheet and having a plurality of generally parallel and sidewardly-spaced stiffening ribs extending longitudinally thereof, said stiffening ribs being of a generally downwardly-opening channel-like cross section, said plurality of ribs defining thereon sidewardly-spaced and longitudinally-extending top wall parts which are alternately sidewardly interposed between longitudinally-extending base wall parts which define bottoms of longitudinally-extending valleys which are defined between sidewardly adjacent said ribs, said floor including a horizontally enlarged central portion which extends longitudinally between front and rear edges of said floor, said floor also having side portions which are disposed on opposite sides of said central portion and define longitudinally-extending outer side edges of the floor, each said side portion having a wheelwell opening formed therein in spaced relation from at least one of the front and rear edges of the floor and opening sidewardly through the respective outer side edge, said stiffening ribs being associated with both said central portion and said side portions of said floor, comprising the improvement wherein said floor, including both said central portion and said side portions, is defined by a one-piece monolithic roll-formed floor pan member having said stiffening ribs extending longitudinally thereof and terminating directly at the front and rear edges thereof so that said front and rear edges have a corrugated configuration, said stiffening ribs being longitudinally roll formed in both said central portion and said side portions, the roll-formed stiffening ribs in said side portions terminating directly at an edge defining the respective wheelwell opening, said edge of said wheelwell opening including at least an edge portion which extends transversely of the ribs in intersecting relation to the outer side edge of the pan and also has a generally corrugated configuration where it intersects the ribs associated with the respective side portion, and a plurality of attachment flanges integrally and monolithicly joined to the side portion around the edge of the wheelwell opening and projecting perpendicularly downwardly for attachment to a wheelwell housing, said plurality of attachment flanges including at least a first said attachment flange attached to one of the base parts and at least a second said attachment flange attached to one of the top wall parts.

2. A bed assembly according to claim 1, wherein said wheelwell opening is positioned in longitudinally spaced relation from the front and rear edges of the pan member so that the respective side portions includes front and rear side portion segments which define therein at least one said stiffening rib which extends substantially continuously through the front and rear side portion segments except for the interruption thereof created by said wheelwell opening.

3. A bed assembly according to claim 2, wherein the wheelwell opening has a longitudinally-extending inner edge which is defined in a predetermined said base wall part which extends parallel to but is spaced sidewardly a predetermined distance from the adjacent longitudinally-extending outer side edge of the pan member, said predetermined base wall part having a transverse width which is significantly greater than the transverse width of the base wall parts formed in said central portion of said pan member.

4. A bed assembly according to claim 3, wherein said first flange is longitudinally elongated along said inner edge and is deformed downwardly from said predetermined base wall part, a said second flange being associated with front and rear edges of said wheelwell opening and projecting downwardly from the top wall part which is positioned sidewardly adjacent said predetermined base wall part, and a third said attachment flange associated with each of said front and rear edges of said wheelwell opening and being integrally joined to and projecting downwardly from a further said base wall part which is positioned sidewardly outwardly from said last-mentioned top wall part, said first and third flanges being of shorter downward extent than said second flange.

5. A vehicle bed assembly having a horizontally enlarged floor constructed from a thin structural sheet and having a plurality of generally parallel and sidewardly-spaced stiffening ribs extending longitudinally thereof, said stiffening ribs being of a generally downwardly-opening channel-like cross section, said plurality of ribs defining thereon sidewardly-spaced and longitudinally-extending top wall parts which are alternately sidewardly interposed between longitudinally-extending base wall parts which define bottoms of longitudinally-extending valleys which are defined between sidewardly adjacent said ribs, said floor including a horizontally enlarged central portion which extends longitudinally between front and rear edges of said floor, said floor also having side portions which are disposed on opposite sides of said central portion and define longitudinally-extending outer side edges of the floor, each said side portion having a wheelwell opening formed therein in spaced relation from at least one of the front and rear edges of the floor and opening sidewardly through the respective outer side edge, said stiffening ribs being associated with both said central portion and said side portions of said floor, comprising the improvement wherein said floor, including both said central portion and said side portions, is defined by a one-piece monolithic roll-formed floor pan member having said stiffening ribs extending longitudinally thereof, said stiffening ribs being longitudinally roll formed in both said central portion and said side portions, an edge of said respective wheelwell opening including at least an edge portion which extends into said side portion and intersects the outer side edge of the pan, and a plurality of attachment flanges integrally and monolithicly joined to the floor pan member around the edge of the wheelwell opening and projecting transversely for attachment to a wheelwell housing.

6. The vehicle bed assembly according to claim 5, wherein said edge of said wheelwell opening includes a longitudinally-extending inner edge portion, and said plurality of attachment flanges includes a flange extending from said inner edge portion and extending transversely of said floor pan member.

7. The vehicle bed assembly according to claim 6, wherein second and third attachment flanges respectively project from front and rear edge portions of said wheelwell opening.

8. The vehicle bed assembly according to claim 5, wherein said stiffening ribs terminate directly at said rear edge so that said rear edge has a corrugated configuration.

9. The vehicle bed assembly according to claim 5, wherein said stiffening ribs in said side portions terminate at said edge of the respective wheelwell opening so that said edge has a corrugated configuration.

10. The vehicle bed assembly according to claim 5, wherein said plurality of attachment flanges includes at least a base attachment flange attached to one of the base wall parts.

11. The vehicle bed assembly according to claim 5, wherein said plurality of attachment flanges includes at least a top wall flange attached to one of the top wall parts.

12. The vehicle bed assembly according to claim 11, wherein said plurality of attachment flanges includes at least a base attachment flange attached to one of the base wall parts.

13. The vehicle bed assembly according to claim 5, wherein second and third attachment flanges respectively project from front and rear edge portions of said wheelwell opening.

14. A bed assembly according to claim 5, wherein a first said attachment flange is longitudinally elongated along a longitudinally-elongated inner edge of said wheelwell opening and is deformed downwardly, second and third said attachment flanges respectively being associated with front and rear edges of said wheelwell opening and projecting downwardly.

15. A bed assembly according to claim 5, wherein said wheelwell opening is positioned in longitudinally spaced relation from the front and rear edges of the pan member so that the respective side portions includes front and rear side portion segments which define therein at least one said stiffening rib which extends substantially continuously through the front and rear side portion segments except for the interruption thereof created by said wheelwell opening.

16. A bed assembly according to claim 5, wherein the wheelwell opening has a longitudinally-extending inner edge portion which is defined in a predetermined said base wall part which extends parallel to but is spaced sidewardly a predetermined distance from the adjacent longitudinally-extending outer side edge of the pan member, said predetermined base wall part having a transverse width which is significantly greater than the transverse width of the base wall parts formed in said central portion of said pan member.

17. The vehicle bed assembly according to claim 5, wherein said floor pan member includes a flat and substantially planar rear flange at said rear edge, and said stiffening ribs end at said rear flange.

18. The vehicle bed assembly according to claim 17, wherein said rear flange is downwardly deformed from said floor pan member.

* * * * *